US009664567B2

(12) United States Patent
Sivathanu et al.

(10) Patent No.: US 9,664,567 B2
(45) Date of Patent: May 30, 2017

(54) METHOD AND APPARATUS FOR MEASURING RAIL SURFACE TEMPERATURE

(71) Applicant: En'Urga, Inc., West Lafayette, IN (US)

(72) Inventors: Yudaya Raju Sivathanu, West Lafayette, IN (US); Jongmook Lim, West Lafyette, IN (US); Vinoo Narayanan, West Lafayette, IN (US)

( * ) Notice: Subject to any disclaimer, the term of this patent is extended or adjusted under 35 U.S.C. 154(b) by 708 days.

(21) Appl. No.: 14/057,755

(22) Filed: Oct. 18, 2013

(65) Prior Publication Data

US 2015/0110151 A1 Apr. 23, 2015

(51) Int. Cl.

| | |
|---|---|
| ***G01J 5/00*** | (2006.01) |
| ***G01J 5/06*** | (2006.01) |
| ***G01J 5/12*** | (2006.01) |
| ***G01J 5/52*** | (2006.01) |
| ***G01J 5/08*** | (2006.01) |

(52) U.S. Cl.
CPC ............. *G01J 5/0003* (2013.01); *G01J 5/061* (2013.01); *G01J 5/0806* (2013.01); *G01J 5/0834* (2013.01); *G01J 5/12* (2013.01); *G01J 5/52* (2013.01)

(58) Field of Classification Search
None
See application file for complete search history.

(56) References Cited

U.S. PATENT DOCUMENTS

| | | | | |
|---|---|---|---|---|
| 3,995,174 A * | 11/1976 | Zrudsky | G01R 19/18 | 327/124 |
| 4,602,642 A * | 7/1986 | O'Hara | G01J 5/02 | 374/126 |
| 6,111,151 A | 8/2000 | Ewing et al. | | |
| 6,370,486 B1 | 4/2002 | Sivathanu | | |
| 6,393,375 B1 | 5/2002 | Sivathanu | | |
| 2004/0114920 A1* | 6/2004 | Rife | G02B 7/028 | 396/535 |
| 2006/0145078 A1* | 7/2006 | Russell | A61B 5/083 | 250/343 |
| 2009/0127478 A1* | 5/2009 | Inoue | G01J 3/108 | 250/504 R |
| 2009/0233192 A1* | 9/2009 | Otsuka | C03C 15/02 | 430/5 |
| 2009/0234522 A1* | 9/2009 | Desanzo | B61L 23/04 | 701/20 |

* cited by examiner

*Primary Examiner* — Erica Lin
(74) *Attorney, Agent, or Firm* — Brinks Gilson & Lione

(57) ABSTRACT

A method and apparatus suitable for measuring temperature of a surface of a segment of a rail using a sensor underneath a moving or a stationary rail car. The measurement is based on intensities of infrared radiation emitted by the surface. The method uses relationships among emissivity, radiation intensity and surface temperature without assuming an emissivity value for the surface. The apparatus comprises radiation detectors containing sensing elements, a lens system, and an analog to digital conversion board to convert radiation intensities to temperature.

18 Claims, 4 Drawing Sheets

METHOD AND APPARATUS FOR MEASURING RAIL SURFACE TEMPERATURE

STATEMENT REGARDING FEDERALLY SPONSORED RESEARCH

This work was supported by the United States Department of Transportation under Contract No. DTRT57-10-C-10083.

CROSS REFERENCE TO RELATED APPLICATIONS

This application claims the benefit of U.S. Provisional Application No. 61/699,928, filed Oct. 22, 2012, the contents of which are incorporated herein by reference.

BACKGROUND OF THE INVENTION

The present invention generally relates to measuring the temperature of a surface of a rail utilizing sensor or sensors embedded underneath of a stationary or moving rail car. The techniques utilized in this invention are useful in estimating the rail surface temperature to aid the locomotive engineer to make appropriate decisions taking into account rail surface temperatures prevailing at any given time and location.

There is great interest in monitoring rail surface temperatures primarily as a mechanism to assure the safety of the railroads. In this discussion "rail temperature" is used to denote the temperature of a surface of a segment of a rail. Most fundamentally, monitoring rail surface temperatures would allow a locomotive engineer to detect an unusually high rail temperature and take necessary action, such as reducing speed. Track engineers have long recognized the benefits of being able to measure rail neutral temperature (RNT) of a rail easily and non-destructively. The RNT is the temperature at which the rail has no longitudinal thermal force. Compressive forces are produced when the rail temperature is higher than the RNT and the rail is in tension at temperatures below the RNT. Excessive tensile forces can cause rail joints to fail or pull apart in cold weather and high compressive forces affect lateral stability of a track and can cause the track to buckle. It is common practice for railroads to issue territory-specific slow-down orders in days with high ambient temperatures. On a sunny day, rail temperatures can exceed the ambient temperature by as much as 40° C. Therefore the rail temperatures can vary between −40° C. and 80° C. throughout the year. Numerous factors affect track buckling. Among them, an important factor is instantaneous rail temperature. Unfortunately, is not is easily obtainable when the rail is moving. Thus there is a great need to obtain instantaneous rail temperature. Measured rail temperatures may also find use in validating rail temperature prediction models.

Rail temperatures are currently being measured using surface thermometers. However, these instruments yield single point measurements, thereby requiring a prohibitively high number of them for monitoring any long section of a rail, which in turn, can be cost-prohibitive. Multiple wavelength infrared intensity measurements constitute a dominant temperature sensing technology in a wide variety of applications. Currently, there are several commercial multi-wavelength infrared pyrometers that provide temperature of objects with a high degree of accuracy. However, the lack of temporal and spatial resolution precludes their direct use in estimating rail temperatures from a moving rail vehicle. Commercial non-contact temperature measurement sensors are currently available. However, these sensors use a single-wave length in the far infrared spectral region. In this portion of the infrared spectrum, dynamic range is limited, especially at lower temperatures. Even high rail temperatures of the order of 65 C are considered low temperatures for these sensors. For many commercial non-contact sensors, an emissivity value is given for a surface of the rail and the emissivity is assumed to be constant. If the emissivity value of the rail deviates the rail surface deviates from this fixed value, the temperature output by the sensor will be inaccurate. Thus it is important that the temperature output by a sensor be independent of the emissivity of the surface of the rail. Thus a need exists to monitor the rail temperature along long sections of the rail even as the rail car is moving, providing accurate rail temperature information to the locomotive engineer, without fixing a constant value for the emissivity of the surface of the rail.

SUMMARY OF THE INVENTION

The present invention provides a method of measuring temperature of a rail from sensors embedded underneath a stationary or moving rail car. The invention also provides an apparatus that comprises radiation intensity sensors and optical and electrical structures needed to process the intensity data. The radiation intensity data is converted to rail temperature to aid the locomotive engineer to take appropriate decisions that depend on the rail temperature.

According to a first aspect of the invention a method of measuring temperature of a surface of a segment of a rail from a stationary or moving rail car is provided. The method comprises attaching radiation intensity sensors to underneath of a rail car, the radiation sensors being capable of measuring intensities of radiation emitted from the surface of the segment of the rail at different wavelengths, obtaining the emissivity-wavelength relationships for the surface of the segment of the rail, and obtaining the temperature of the surface of the segment of the rail from emissivity-temperature-radiation intensity relationships.

According to a second aspect of the invention, an apparatus, herein after called a temperature sensor, for sensing the intensities of radiation emitted from a surface of a segment of a rail at selected wavelengths from a stationary or moving rail car and utilizing these intensities to derive a temperature value is provided. The apparatus comprises a chopper maintained at a constant reference temperature, a thermoelectric cooler capable of maintaining temperature of the chopper at a constant value, a detector capable of sensing the difference in the intensities of radiation emitted from the chopper and the surface of the segment of the rail, a set of lenses which define the area of the surface of the segment of the rail from which emitted radiation is received by the detector, a drive circuit board capable of providing bias voltage to the detector and amplifying the signal from the detector, an analog to digital converter circuit board capable of converting analog signals from the detector to temperature values, a data cable capable of transmitting data from the analog to digital converter circuit board to devices external to the apparatus, a power supply capable of providing power to the drive circuit board, analog to digital converter circuit board, the thermoelectric cooler, and the detectors. The apparatus further comprises a window capable of allowing radiation from the surface of the segment of the rail to pass through, and a heat sink that provides cooling to protect the apparatus from excessive heat.

A third aspect of the invention is a method of measuring temperature of a surface of a segment of a rail comprising the steps of attaching a radiation intensity sensor containing four sensing elements made of PbSe or HgCdTe underneath of a rail car, the said sensing elements each capable of measuring intensities of emitted radiation corresponding to a specific wavelength emitted from the surface of the segment of the rail, obtaining emissivity-wavelength relationships of the surface of the segment of the rail, and obtaining the temperature of the surface of the segment of the rail utilizing emissivity-temperature-radiation intensity relationships.

A technical effect of the invention is that rail temperatures of long rail tracks are obtained from a stationary or moving rail car, providing the locomotive engineer with rail temperature information. Further the method and the apparatus of this invention provide non-contact, lower-cost alternatives to existing methods of tracking rail temperature across long rail roads.

Another technical effect of the invention is that the rail temperature is obtained without the need for assuming or fixing a value for the emissivity of the rail surface. This is advantageous since emissivity of the rail surface can vary from region to region and due to variations in material composition. The present invention is thus capable of providing more accurate temperature values compared to methods that use a fixed value for the emissivity of a rail surface.

Other aspects and advantages of this invention will be better understood from the following detailed description.

DETAILED DESCRIPTION OF THE INVENTION

Figure 1:
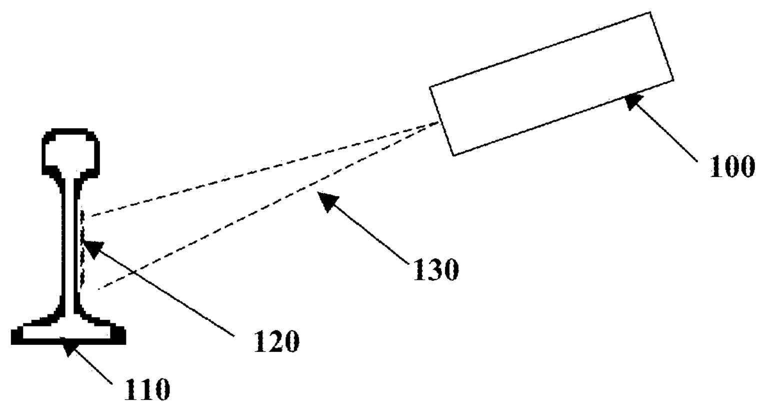
FIG. 1 is a schematic representation of the configuration of temperature sensing apparatus, also called temperature sensor, and rail surface.
Figure 2:
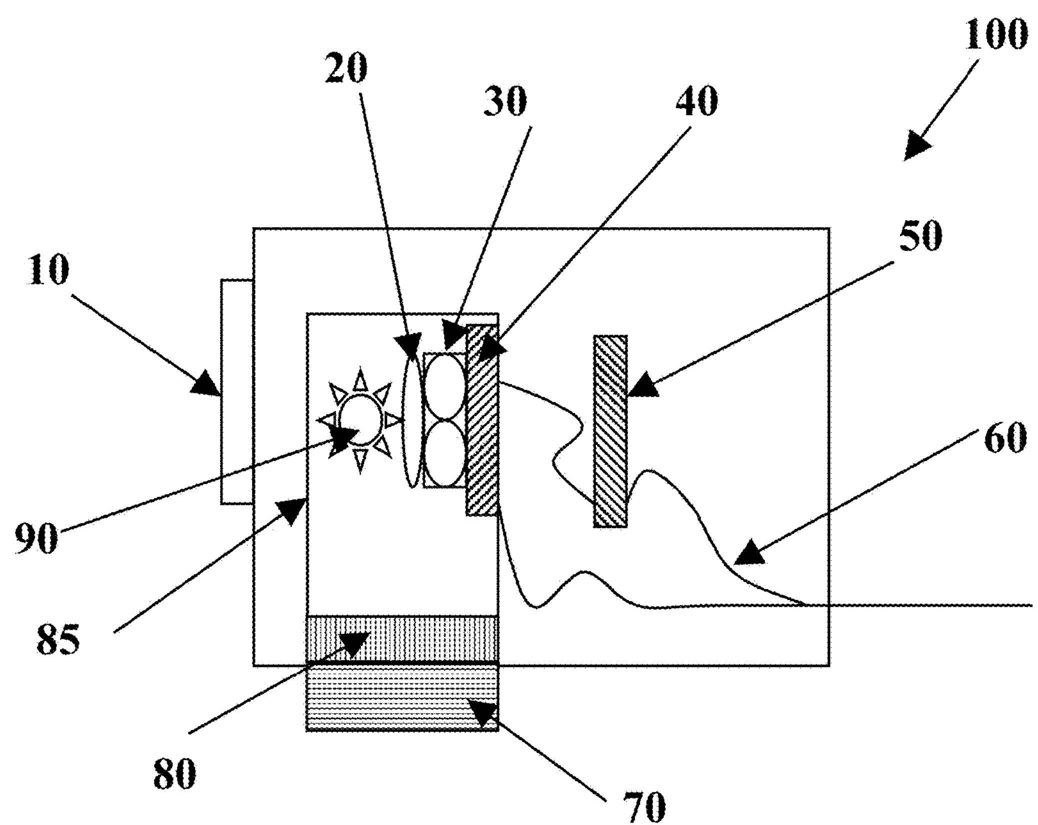
FIG. 2 is a schematic representation of apparatus utilized to measure temperature of rail. This apparatus is also termed rail temperature sensor or simply temperature sensor.
Figure 3:
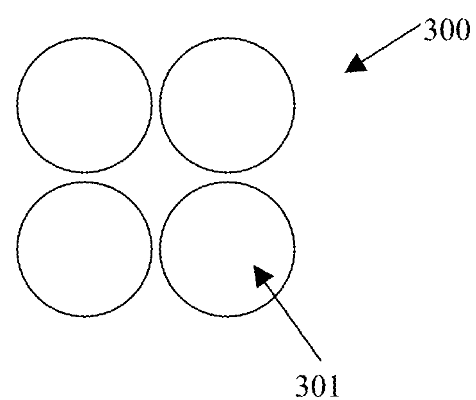
FIG. 3 is a schematic representation of a quadrant detector.
Figure 4:
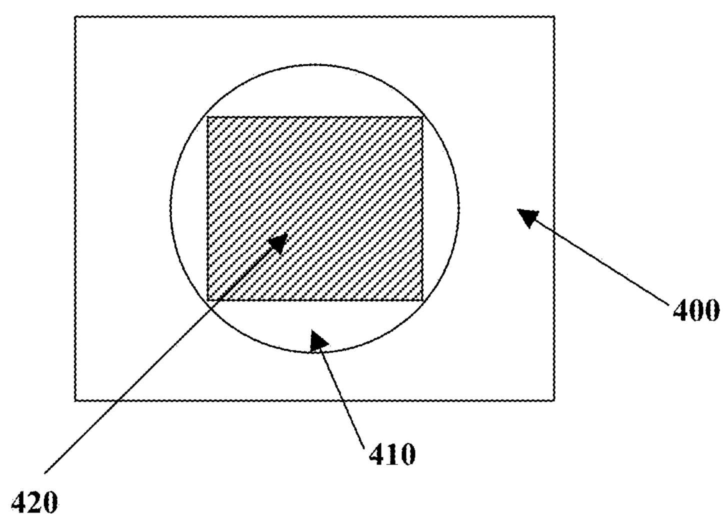
FIG. 4 is a schematic representation of the area of the rail surface from which radiation intensity is sensed.

The present invention is directed to measuring temperature of a surface of a segment of a rail, hereinafter referred to as the temperature of the rail, from a stationary or a moving rail car. In this description, "a surface of a segment of a rail" and "rail" will be used interchangeably. The method measures the intensities of infrared radiation emitted by the rail and converts them to temperature of the rail utilizing relationships among the emissivity of rail surface, intensities of radiation at different wave lengths emitted by the rail, and the temperature of the rail. Measuring temperatures from the intensities of emitted radiation has been described in U.S. Pat. No. 6,111,151, U.S. Pat. No. 6,370,486, and U.S. Pat. No. 6,393,375 B1. The method of measuring the temperature of the rail will be explained with reference to FIGS. 1 through 4. FIG. 1 schematically represents a cross section of a rail 110, a side view of a segment 120 of the rail and a temperature sensor 100 which is understood to be underneath a rail car. In FIG. 1 the emitted radiation from the rail segment 120 reaching the temperature sensor is represented as 130. FIG. 2 schematically represents a preferred embodiment 100 of an apparatus used to measure the intensities of radiation emitted from a surface of a segment of a rail. This apparatus is also called in this discussion a temperature sensor or rail temperature sensor. This apparatus is also referred to as radiation-intensity sensor. In FIG. 2, radiation from a rail is received through a window 10 and passes through a chopper 90 and is focused through a set of lenses (also called a lens system) 20 and is received by a quadrant detector 30. The quadrant detector is so called because it employs four detectors. The signal from the detector 30 is amplified by the drive circuit board 40 which also provides needed bias voltage to detector 30. The amplified signal from detector 30 is transmitted to analog to digital converter 50 by way of power supply-data cable combination 60. Data cable 60 also transmits the temperature value to any desired external devices which could be computers, transmitters, or analog meters. A thermoelectric cooler 80 ensures the chopper 90 is maintained at a constant temperature. The apparatus 100 is protected from excessive heat by a heat sink 70. Lens 20, detector 30, drive circuit board 40, thermoelectric cooler 80, and chopper 90 are enclosed in an enclosure 85. The enclosure is typically made of aluminum that is insulated on the inside to prevent excessive heat from entering the enclosure. The bottom of the enclosure is directly mounted on the thermoelectric cooler using a heat conducting adhesive and screws. FIG. 3 schematically represents a top view of a quadrant detector 300, containing four single element detectors, 301. FIG. 4 shows a schematic representation of the top view of a rail segment 400, area 410 of a rail segment viewable through the lens 20 and area 420 of the rail segment from which emitted radiation is detected by detector 30.

For exemplary purposes, the construction of the apparatus 100 can be further described. Lenses of lens system 20 can be made of calcium fluoride, as a non-limiting example, and are obtainable from optical component vendors. Detector 30 can be a quadrant detector with four detector elements, each made of PbSe (lead selenide) with four corresponding infrared interference filters in front of them (interference filters are not shown in FIG. 2). Detector 30 can, in general, have three or more sensing elements. Three elements are necessary as a minimum to get an accurate solution of the mathematical relationships described later in this description. Alternatively, the lenses in the lens system itself can be coated with infrared interference filter coatings. Infrared interference filters or alternatively infrared interference coatings allow only infrared radiation at the specified wavelength and with a specific bandwidth to pass through the lens to be detected by each of the four detectors 30. Other detector materials can be employed instead of PbSe. HgCdTe and thermopiles are examples of such materials. In a preferred embodiment, the interference filters have different central wave lengths in the 3400 nm 4100 nm micron band to avoid gas band. The gas band values avoided here refer to water vapor at 2700 nm and carbon dioxide at 4300 nm. The bandwidth of the interference filters can range from 30 nm to 200 nm. It is to be noted that other methods of collecting radiation such as cone light collectors or fiber optics can be used in place of the lens 20 so as to have a non-imaging version of the sensor. It is noted that prisms and gratings could be used in place of the interference filters to ensure that the four elements of the detector see different central wavelength regions with different bandwidths. FIG. 4 illustrates the typical radiation collection area for any one of the four elements in the quadrant detector. The radiation collection areas for the four elements do not generally overlap due to the lens tolerances and the spacing between the elements of the quadrant detector.

The temperature measurement of the rail is achieved as described below. The apparatus 100 is attached to the underside of a rail car. When positioned to allow radiation emitted from the rail to pass through the apparatus, the quadrant detector will provide four voltages through the data cable 60 for each of the four wavelengths selected. These wavelengths are selected to be within the 3400 nm to 4100 nm band to avoid gas bands such as water vapor at 2700 nm microns and carbon dioxide at 4300 microns. Further the wavelengths can be equally spaced with very similar bandwidths so as to obtain the optimal signal on all four elements of the sensor. In the current embodiment, the selected central wavelengths are 3500, 3650, 3800, and 3950 nm with a bandwidth (width at half the peak transmittance level) of 150 nm. These voltages are converted to spectral radiation intensities using a standard blackbody calibration procedure known to those skilled in the art. The intensities are reduced to provide the temperature of the rail as follows. The spectral radiation intensity ($I_\lambda$) emitted by the rail at any wavelength, λ can be obtained as:

$$I_\lambda = \varepsilon_\lambda I_{b\lambda} = \varepsilon_\lambda \left( \frac{C_1}{\lambda^5 \left\{ \exp\left(\frac{C_2}{\lambda T}\right) - 1 \right\}} \right) \tag{1}$$

where $I_{b\lambda}$ is the black body intensity, which depends purely on the temperature of the rail surface, T. $C_1$ and $C_2$ are the well-known first and second radiation constants and $\epsilon_\lambda$ is the spectral emissivity of the rail. The measurements at four wavelengths provide four values of intensities. There are five unknowns, the temperature, and the spectral emissivity at the four wavelengths. However, utilization of four wavelengths, relatively close to each other, enables us to implement a variety of models for the spectral emissivity of the rails. The model chosen for this invention assumed that the emissivity varied with wavelength and temperature as follows:

$$\epsilon_\lambda = \exp(K_0\lambda + K_1 T) \tag{2}$$

where $K_0$ and $K_1$ are unknown model constants. This reduces the number of unknowns in Eq. (1) to three, the temperature, T, and the model constants $K_o$ and $K_1$. Other models can also be used and are known to those skilled in the art.

Equation (1) is non-linear, and iterative methods for non-linear equations do not guarantee convergence. Therefore, Eq. (1) was linearized as follows. Taking a logarithm for both side of Eq. (1) yields:

$$\log(I_\lambda) = \log(I_{b\lambda}) + \log(\epsilon_\lambda) \tag{3}$$

Taking partial derivatives of the black body equation yields:

$$\frac{\partial \log(I_{b\lambda})}{\partial T} = \frac{\exp\left(\frac{C_2}{\lambda T}\right)\frac{C_2}{\lambda T^2}}{\left(\exp\left[\frac{C_2}{\lambda T}\right] - 1\right)} \tag{4}$$

which is approximated with the linear equation:

$$\log(I_{b\lambda}) \approx A + B \cdot T \tag{5}$$

where A and B are constants given by:

$$A = -\frac{\partial \log(I_{b\lambda})}{\partial T} T_0 + \log(I_{b\lambda}(T_0)),\ B = \frac{\partial \log(I_{b\lambda}(T_0))}{\partial T} \tag{6}$$

where $T_O$ is the temperature at each iteration cycle of the algorithm starting with an initial guess, and T is the updated value of temperature. Similarly, the emissivity is given by:

$$\log(\epsilon_\lambda) = K_0\lambda + K_1 T_1 \tag{7}$$

Using Eq. (5) and Eq. (7), the intensity at a wavelength can be obtained as:

$$\log(I_\lambda) \approx \lambda \cdot K_0 + T(B + K_1) + A \tag{8}$$

From the measurements, we have four known values of intensities, with the three unknown quantities being temperature, and the model constants, $K_0$ and $K_1$. This is an overspecified linear equation with positivity constraints. This satisfies all the criteria required to obtain the most optimal solution using the Maximum Likelihood Estimation (MLE) method (Vardi and Lee, 1993) (Vardi, Y., and Lee, D., "From Image Deblurring to Optimal Investments: Maximum Likelihood Solutions for Positive Linear Inverse Problems," J. R. Statist. Soc. B, vol. 55, pp. 569-612, 1993.) The MLE method guarantees convergence to the most optimal solution. It should be noted that other methods of converting the intensities to temperature, such as other linear and non-linear iteration methods can be used with the present invention.

It should be noted that the methodology described above results in a temperature value for the rail surface without assuming a fixed or constant value for the emissivity of the rail surface. This is a marked departure from non-contact methods employed earlier for measuring rail surface temperature, which assume a constant value for the emissivity of the rail surface.

Temperature data were obtained using the present invention during a rail experiment conducted on the Western Maryland Scenic Railway (in collaboration with the Department of Transportation) Temperature data were also obtained using the conventional contact-type thermocouple measurements. The temperature measurements were in agreement within 2° C.

It should be noted that the methodology described above results in a temperature value for the rail surface without assuming a fixed or constant value for the emissivity of the rail surface. This is a marked departure from non-contact methods employed earlier for measuring rail surface temperature, which assume a constant value for the emissivity of the rail surface.

While the invention has been described in terms of specific embodiments, including particular configurations, measurement techniques and materials, it is apparent that other forms could be adopted by one skilled in the art. Accordingly, it should be understood that the invention is not limited to the specific disclosed embodiments. Therefore, the scope of the invention is to be limited only by the following claims.

The invention claimed is:

1. An apparatus comprising:

a radiation-intensity sensor, configured to be mounted on an in motion or stationary rail car, capable of determining the temperature of the surface of a segment of a rail, the radiation-intensity sensor comprising:

a lens system configured to define an area of a surface of a segment of a rail upon which the in motion or stationary rail car is positioned;

a window configured to transmit radiation at a variety of different wavelengths from the surface of the segment of the rail towards the lens system;

a chopper maintained at a constant reference temperature and configured to receive and emit radiation of varying intensities;

a detector configured to sense a difference in the intensities of the radiation emitted from the chopper and the surface of the segment of the rail;

a drive circuit board configured to provide bias voltages to the detector and amplify signals received from the detector;

an analog to digital converter circuit board configured to convert analog signals from the detector to temperature values for transmission to devices external to the apparatus;

a power supply configured to provide power to the drive circuit board and the analog to digital converter circuit board;

a thermoelectric cooler configured to maintain a temperature of the chopper at the constant reference temperature; and a heat sink cooperatively operable with the thermoelectric cooled;

the radiation-intensity sensor configured to determine an emissivity of the rail based on the measured intensity of the radiation at the different wavelengths emitted from the surface of the segment of the rail, and the radiation-intensity sensor further configured to obtain a temperature of the surface of the segment of the rail from emissivity-temperature-radiation intensity relationships determined from the intensity of a radiation at the different wavelengths.

2. The apparatus of claim 1, wherein the lens system is made of calcium fluoride ($CaF_2$).

3. The apparatus of claim 1, wherein the heat sink is made of aluminum or aluminum alloys.

4. The apparatus of claim 1, wherein the window is made of sapphire.

5. The apparatus of claim 1, wherein the detector comprises three or more sensing elements.

6. The apparatus of claim 1, wherein the detector comprises four sensing elements.

7. The apparatus of claim 6, wherein the detector comprises sensing elements made of PbSe or HgCdTe.

8. The apparatus of claim 6, wherein the sensing elements are made of thermopiles.

9. The apparatus of claim 1, further comprising a data cable configured to transmit data from the analog to digital converter to devices external to the apparatus.

10. An apparatus comprising:

a radiation-intensity sensor configured to mount in a stationary or moving rail car to measure temperature of a surface of a segment of a rail upon which the stationary or moving rail car is positioned, the radiation-intensity sensor comprising:

a window configured to receive radiation at a plurality of different wavelengths, the radiation at the different wavelengths received from the surface of the segment of the rail;

a chopper configured to receive and emit the radiation;

a cooler configured to maintain the chopper at a predetermined temperature;

a lens system configured to focus the radiation received via the chopper; and a detector configured to receive the radiation from the lens system and measure an intensity of the radiation at the different wavelengths emitted from the surface of the segment of the rail;

the radiation-intensity sensor configured to determine an emissivity of the rail based on the measured intensity of the radiation at the different wavelengths emitted from the surface of the segment of the rail, and obtain a temperature of the surface of the segment of the rail from emissivity-temperature-radiation intensity relationships determined from the intensity of the radiation at the different wavelengths.

11. The apparatus of claim 10, wherein the detector comprises at least three sensing elements configured to sense different wavelengths of infrared radiation included in the radiation.

12. The apparatus of claim 11, wherein the at least three sensing elements are configured to each detect non-overlapping radiation collection areas.

13. The apparatus of claim 11, wherein the detector comprises corresponding interference filters configured to allow infrared radiation at only a predetermined bandwidth to be received by the at least three sensing elements.

14. The apparatus of claim 10, wherein the different wavelengths are within a range of 3400 nm to 4100 nm.

15. The apparatus of claim 11, wherein the at least three sensing elements comprise either PbSe or HgCdTe.

16. The apparatus of claim 11, wherein the at least three sensing elements are thermopiles.

17. The apparatus of claim 10, wherein the radiation-intensity sensor is mounted in an insulated enclosure and includes a heat sink in cooperative operation with the cooler.

18. An apparatus comprising:

a radiation-intensity sensor configured to measure a temperature of a surface of a segment of a rail from a stationary or moving rail car, the radiation-intensity sensor including a detector containing sensing elements and being configured to mount to the stationary or moving rail car, the radiation-intensity sensor configured to measure intensities of radiation at different wavelengths emitted from a surface of the segment of the rail; and the radiation-intensity sensor further configured to determine an emissivity of the rail based on the measured intensities of radiation, and obtain emissivity-wavelength relationships of the surface of the segment of the rail, the radiation-intensity sensor further configured to obtain the temperature of the surface of the segment of the rail from emissivity-temperature-radiation intensity relationships.

* * * * *